(12) United States Patent
Oster et al.

(10) Patent No.: US 10,908,654 B2
(45) Date of Patent: Feb. 2, 2021

(54) DISPLAY GROUNDING STRUCTURES

(71) Applicant: Apple Inc., Cupertino, CA (US)

(72) Inventors: Carli E. Oster, San Francisco, CA (US); Chi Zhang, Cupertino, CA (US); Haowei Wang, Cupertino, CA (US); Lucas R. Compton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/134,738

(22) Filed: Sep. 18, 2018

(65) Prior Publication Data

US 2020/0089287 A1 Mar. 19, 2020

(51) Int. Cl.
*G06F 1/16* (2006.01)
*G06F 1/18* (2006.01)

(52) U.S. Cl.
CPC .......... *G06F 1/1698* (2013.01); *G06F 1/1637* (2013.01); *G06F 1/1656* (2013.01); *G06F 1/182* (2013.01)

(58) Field of Classification Search
CPC .......... G06F 1/1698; G06F 3/044; H05K 7/00
See application file for complete search history.

(56) References Cited

U.S. PATENT DOCUMENTS

| | | | |
|---|---|---|---|
| 8,542,154 B2 | 9/2013 | You et al. | |
| 8,824,152 B2 | 9/2014 | Chen et al. | |
| 9,402,302 B2 * | 7/2016 | Kim | H05K 1/0218 |
| 9,415,854 B2 * | 8/2016 | Yokoi | B60J 10/16 |
| 9,513,670 B2 | 12/2016 | Chen et al. | |
| 9,805,939 B2 * | 10/2017 | Grimbergen | H01L 21/3085 |
| 2013/0342495 A1 * | 12/2013 | Rappoport | H05K 9/0054 345/174 |
| 2014/0084045 A1 * | 3/2014 | Yang | A61B 5/6804 228/175 |
| 2017/0244153 A1 | 8/2017 | Chen et al. | |
| 2018/0090818 A1 | 3/2018 | Boerman et al. | |

FOREIGN PATENT DOCUMENTS

| | | |
|---|---|---|
| CN | 107003702 A | 8/2017 |
| CN | 206524399 U | 9/2017 |

* cited by examiner

*Primary Examiner* — Muthuswamy G Manoharan
(74) *Attorney, Agent, or Firm* — Treyz Law Group, P.C.; Michael H. Lyons; Matthew R. Williams

(57) ABSTRACT

An electronic device may be provided with a display and conductive sidewalls. The display may include conductive display structures and a cover layer. The cover layer may be mounted to the sidewalls. The sidewalls may define antenna apertures for antennas in the device. Grounding structures may be coupled between the conductive display structures and the sidewalls at locations that at least partially overlap the antenna apertures. The grounding structures may include conductive tape having an adhesive surface. The conductive tape may have a first end at which the adhesive surface is coupled to the conductive display structures. The conductive tape may have a second end that is folded around a layer of heat-activated film and that is coupled to both the display cover layer and the conductive sidewalls. Conductive tape overlapping each antenna aperture may be concurrently assembled into the electronic device as the display is mounted to the sidewalls.

19 Claims, 10 Drawing Sheets

DISPLAY GROUNDING STRUCTURES

FIELD

This relates generally to electronic devices, and more particularly, to electronic devices with wireless circuitry.

BACKGROUND

Electronic devices often include wireless circuitry with antennas. For example, cellular telephones, computers, and other devices often contain antennas for supporting wireless communications.

It can be challenging to form electronic device antenna structures with desired attributes. In some wireless devices, the presence of conductive structures such as conductive housing structures and conductive components can influence antenna performance. Antenna performance may not be satisfactory if the conductive structures are not configured properly and interfere with antenna operation or if antennas are undesirably influenced due to conductive structures in nearby components. Device size can also affect performance. It can be difficult to achieve desired performance levels in a compact device, particularly when the compact device has conductive components and housing structures.

It would therefore be desirable to be able to provide improved wireless circuitry for electronic devices such as electronic devices that include conductive structures.

SUMMARY

An electronic device may be provided with a display and a device housing having conductive sidewalls. The display may include conductive display structures and a display cover layer overlapping the conductive display structures. The display cover layer may be mounted to the conductive sidewalls. The conductive sidewalls may at least partially define one or more antenna apertures for antennas in the electronic device. In order to optimize antenna efficiency and bandwidth through the display, grounding structures may be coupled between the conductive display structures and the conductive sidewalls at locations that at least partially overlap each antenna aperture.

The grounding structures may include conductive tape having an adhesive surface and an opposing non-adhesive surface. The conductive tape may have a first end at which the adhesive surface is coupled to the conductive display structures. The conductive tape may have a second end that is folded around a layer of heat-activated film and that is coupled to both the display cover layer and the conductive sidewalls. The conductive tape may electrically couple the conductive display structures to a ground potential through the conductive sidewalls. Heat-activated, pressure-sensitive adhesive may also be used to adhere the display cover layer to the conductive sidewalls. The heat activated, pressure-sensitive adhesive may include a notch that accommodates the conductive tape.

A heat press may be used to press the display onto the conductive housing walls during assembly of the electronic device. The heat press may heat the heat-activated film to allow the display cover layer to be pressed until an exterior surface of the display cover layer lies flush with a top surface of the conductive sidewalls. Conductive tape overlapping each antenna aperture in the device may be concurrently assembled into the electronic device. This may serve to minimize variations in the height of the exterior surface of the display cover layer relative to the top surface of the conductive sidewalls across the front face of the device, for example.

DETAILED DESCRIPTION

Figure 1:
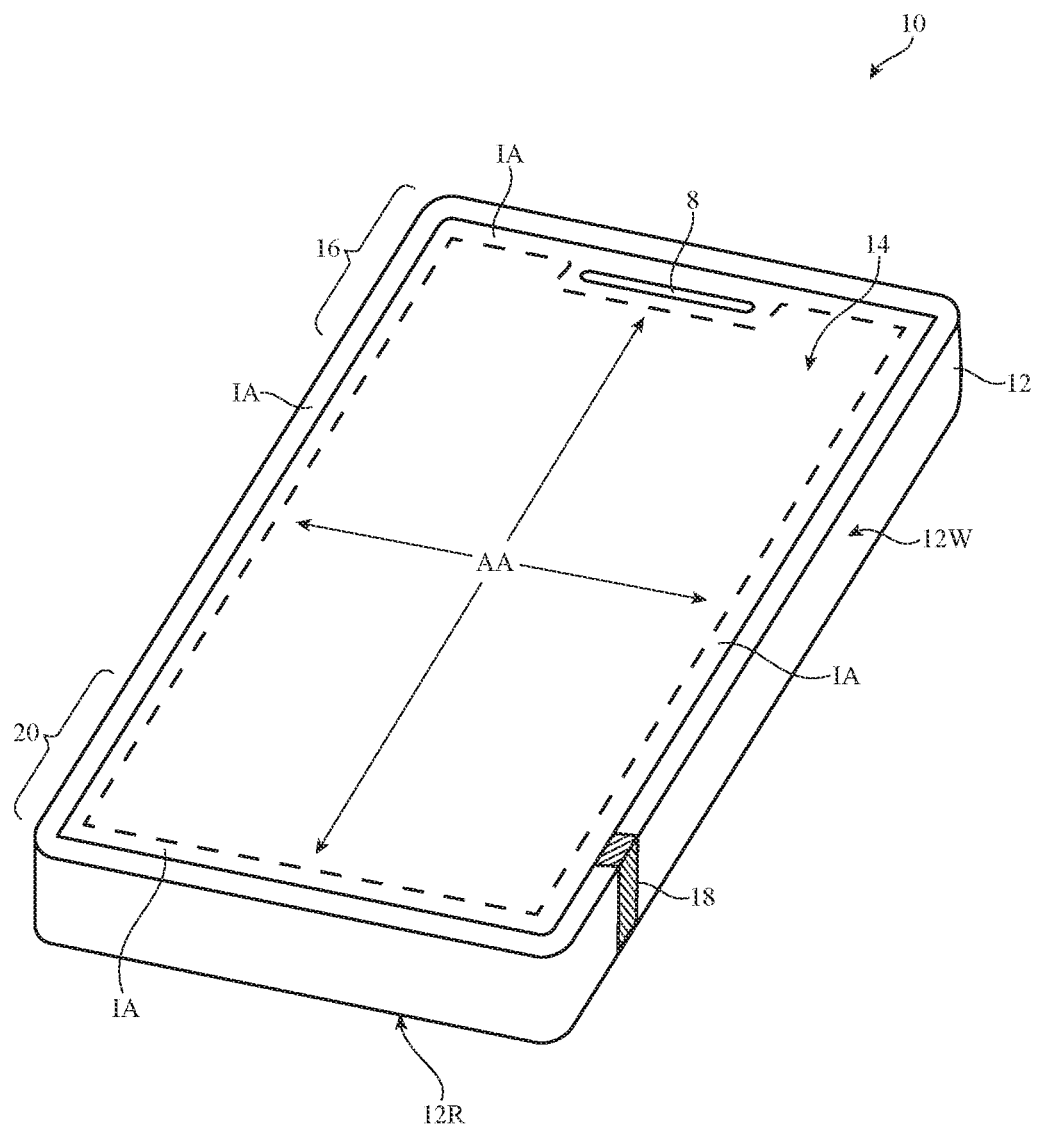
FIG. 1 is a perspective view of an illustrative electronic device in accordance with an embodiment.

An electronic device may be provided with conductive structures that are used to form one or more antennas. The conductive structures may include conductive housing structures. The electronic device may include a display having a display module overlapped by a display cover layer. The display module may include conductive display structures. The display cover layer may be secured to the conductive housing structures using adhesive.

The conductive display structures may occupy a significant portion of the lateral area of the display in order to provide as large an active area as possible for the display. This may limit the volume within the electronic device available to form the antennas. If care is not taken, confining antenna volume in this way can limit antenna bandwidth and efficiency. Similarly, the conductive display structures can block the antennas from radiating through the display cover layer with satisfactory bandwidth and efficiency.

In order to maximize bandwidth and efficiency for the antennas, the display may be coupled to a ground potential using conductive grounding structures. Each antenna may have a corresponding antenna aperture. The grounding structures may be coupled between the conductive display structures and the conductive housing structures at one or more locations that at least partially overlap the antenna aperture for each antenna. The grounding structures may also be used to help secure the display to the conductive housing structures.

As an example, the grounding structures may include conductive tape having an adhesive surface and a non-adhesive surface. The adhesive surface at a first end of the conductive tape may be coupled to the conductive display structures. The adhesive surface at a second end of the conductive tape may be coupled to a ledge or datum of the conductive housing structures. The second end of the conductive tape may be folded around a layer of heat-activated film. The heat-activated film may allow the second end of the conductive tape to be compressed during assembly of the electronic device. This may help to ensure that the display cover layer lies flush with a top surface of the conductive housing structures.

Other adhesives such as a layer of heat activated, pressure-sensitive adhesive may be used to help mount the display cover layer to the conductive housing structures. This pressure-sensitive adhesive may have a notch to accommodate the conductive tape. Grounding structures overlapping each antenna in the electronic device may be concurrently assembled into the electronic device to minimize manufacturing variations between the antennas. For example, the grounding structures overlapping each antenna may be assembled into the electronic device during the same assembly process used to mount the display to the conductive housing structures.

As an example, the pressure-sensitive adhesive and grounding structures for each antenna may be mounted to the same dielectric liner. The conductive display structures may be mounted to the display cover layer and placed within a fixture. The liner may be aligned with the fixture and may be pressed onto the display to mount the pressure-sensitive adhesive and the grounding structures to the display. The display may then be mounted to the conductive housing structures. A heat press may press the display onto the conductive housing structures to activate the pressure-sensitive adhesive. Heated press heads may be used to press on the display cover layer at locations overlapping the grounding structures to activate the heat activated film in each of the ground structures. Assembling the electronic device in this way may serve to minimize variations in height of the display cover layer over the conductive housing structures across the lateral face of the electronic device.

An electronic device that may include a display and conductive grounding structures for the display is shown in FIG. 1. Electronic devices such as electronic device 10 of FIG. 1 may be provided with wireless communications circuitry. The wireless communications circuitry may be used to support wireless communications in one or more wireless communications bands.

For example, the wireless communications circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz Wi-Fi® wireless local area network bands (sometimes referred to as IEEE 802.11 bands or wireless local area network communications bands). Device 10 may also contain wireless communications circuitry for implementing near-field communications at 13.56 MHz or other near-field communications frequencies. If desired, device 10 may include wireless communications circuitry for communicating at 60 GHz, circuitry for supporting light-based wireless communications, or other wireless communications.

The wireless communications circuitry may include one more antennas. The antennas of the wireless communications circuitry can include loop antennas, inverted-F antennas, strip antennas, planar inverted-F antennas, dipole antennas, monopole antennas, helical antennas, waveguide antennas, slot antennas, hybrid antennas that include antenna structures of more than one type, or other suitable antennas.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other.

Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, conductive sidewalls, peripheral conductive housing sidewalls, sidewalls, sidewall structures, or a peripheral conductive housing member (as examples). Conductive sidewalls 12W may be formed from a metal such as stainless steel, aluminum, or other suitable materials. One, two, or more than two separate structures may be used in forming conductive sidewalls 12W.

It is not necessary for conductive sidewalls 12W to have a uniform cross-section. For example, the top portion of peripheral conductive housing structures 12W may, if desired, have an inwardly protruding lip (e.g., a ledge or datum) that helps hold display 14 in place. The bottom portion of conductive sidewalls 12W may also have an enlarged lip (e.g., in the plane of the rear surface of device 10). Conductive sidewalls 12W may be substantially straight vertical sidewalls, may have curved portions, or may have other suitable shapes.

If desired, rear housing wall 12R may be formed from a metal such as stainless steel or aluminum and may sometimes be referred to herein as conductive rear housing wall 12R or conductive rear wall 12R. Conductive rear housing wall 12R may lie in a plane that is parallel to display 14. In configurations for device 10 in which rear housing wall 12R is formed from metal, it may be desirable to form parts of conductive sidewalls 12W as integral portions of the housing structures forming the conductive rear housing wall of housing 12. For example, conductive rear housing wall 12R of device 10 may be formed from a planar metal structure and portions of conductive sidewalls 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions.

Conductive sidewalls 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 8 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate or midplate) that spans the walls of housing 12 (i.e., a substantially rectangular sheet formed from one or more metal parts that is welded or otherwise connected between opposing sides of conductive sidewalls 12W). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 16 and 20, openings may be formed within the conductive structures of device 10 (e.g., between conductive sidewalls 12W and opposing conductive ground structures such as conductive portions of conductive rear housing wall 12R, conductive traces on a printed circuit board, conductive electrical components in display 14, etc.). These openings, which may sometimes be referred to as gaps or slots, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 16 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 16. If desired, the ground plane that is under active area AA of display 14 and/or other metal structures in device 10 may have portions that extend into parts of the ends of device 10 (e.g., the ground may extend towards the dielectric-filled openings in regions 20 and 16), thereby narrowing the slots in regions 20 and 16.

In general, device 10 may include any suitable number of antennas (e.g., one or more, two or more, three or more, four or more, etc.). The antennas in device 10 may be located at opposing first and second ends of an elongated device housing (e.g., at ends 20 and 16 of device 10 of FIG. 1), along one or more edges of a device housing, in the center of a device housing, in other suitable locations, or in one or more of these locations. The arrangement of FIG. 1 is merely illustrative.

Portions of conductive sidewalls 12W may be provided with peripheral gap structures. For example, conductive sidewalls 12W may be provided with one or more gaps such as gaps 18, as shown in FIG. 1. The gaps in peripheral conductive sidewalls 12W may be filled with dielectric such as polymer, ceramic, glass, air, other dielectric materials, or combinations of these materials. Gaps 18 may divide conductive sidewalls 12W into one or more peripheral conductive segments. There may be, for example, two peripheral conductive segments in conductive sidewalls 12W (e.g., in an arrangement with two of gaps 18), three peripheral conductive segments (e.g., in an arrangement with three of gaps 18), four peripheral conductive segments (e.g., in an arrangement with four of gaps 18), six peripheral conductive segments (e.g., in an arrangement with six gaps 18), etc. The segments of conductive sidewalls 12W that are formed in this way may form parts of antennas in device 10.

If desired, openings in housing 12 such as grooves that extend partway or completely through housing 12 may extend across the width of rear wall 12R of housing 12 and may penetrate through the rear wall of housing 12 to divide the rear wall into different portions. These grooves may also extend into conductive sidewalls 12W and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 16. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area of regions 20 and 16 that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency bandwidth.

Figure 2:
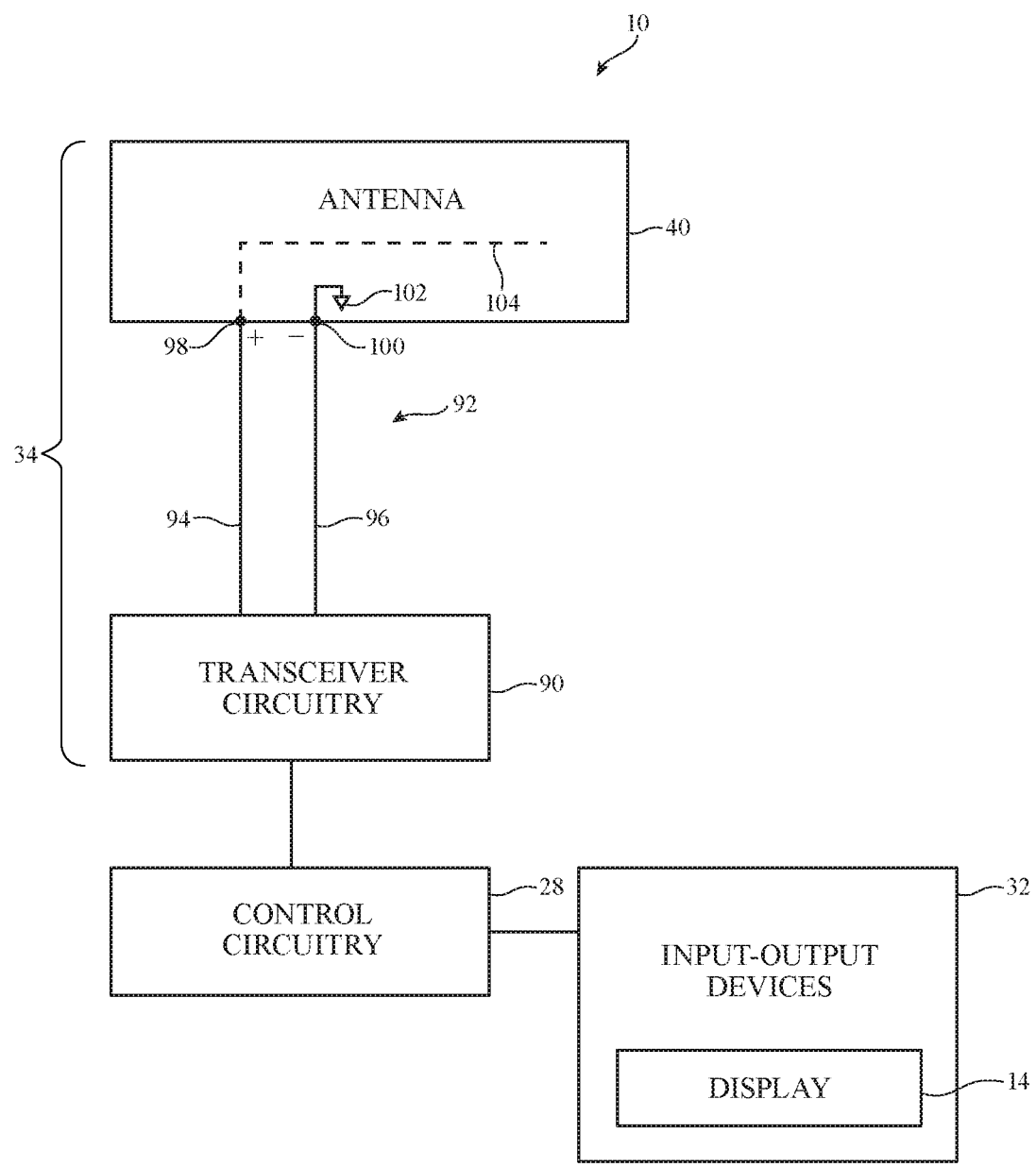
FIG. 2 is a schematic diagram of illustrative circuitry in an electronic device in accordance with an embodiment.

A schematic diagram of device 10 is shown in FIG. 2. As shown in FIG. 2, transceiver circuitry 90 in wireless circuitry 34 may be coupled to antenna structures such as antenna 40 using paths such as path 92. Wireless circuitry 34 may be coupled to control circuitry 28. Control circuitry 28 may be storage and processing circuitry that includes storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 28 may be used to control the operation of device 10. This processing circuitry may be based on one or more microprocessors, microcontrollers, digital signal processors, application specific integrated circuits, etc.

Control circuitry 28 may be used to run software on device 10, such as internet browsing applications, voice-over-internet-protocol (VOIP) telephone call applications, email applications, media playback applications, operating system functions, etc. To support interactions with external equipment, circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, etc.

Control circuitry 28 may be coupled to input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button or a fingerprint sensor that takes the place of a button), etc.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits to tune antennas over communications bands of interest.

Path 92 may include one or more transmission lines. As an example, signal path 92 of FIG. 2 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna 40. As an example, antenna 40 may be formed from an antenna resonating element such as antenna resonating element 104 and an antenna ground such as antenna ground 102 (sometimes referred to herein as ground plane 102). Antenna resonating element 104 and antenna ground 102 may be used to form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 2 is merely illustrative.

As shown in FIG. 2, input-output devices 32 include display 14. Display 14 may include a display module that is covered by a transparent display cover layer. The display module may include stacked dielectric layers having pixel circuitry, touch sensor electrodes, force sensor circuitry, and/or other active components associated with emitting light and/or receiving input through the display cover layer. The display module may include conductive display structures such as conductive display structures 110 of FIG. 3.

Conductive display structures 110 may include a conductive frame for the active components of display 14, conductive layers in the display module (e.g., a conductive backplate for the display module or conductive layers embedded within the dielectric layers of the display module), conductive shielding structures, ground layers in display 14, and/or other conductive structures in display 14. If desired, conductive display structures 110 may include portions of the pixel circuitry, touch sensor circuitry, force sensor circuitry, and/or other components in the display module for display 14. Conductive display structures 110 may laterally extend across active area AA of FIG. 1, for example. As active area AA of display 14 is maximized, the space within device 10 occupied by the display module and conductive display structures 110 are also maximized, thereby limiting the amount of space available within device 10 for forming antennas 40.

Figure 3:
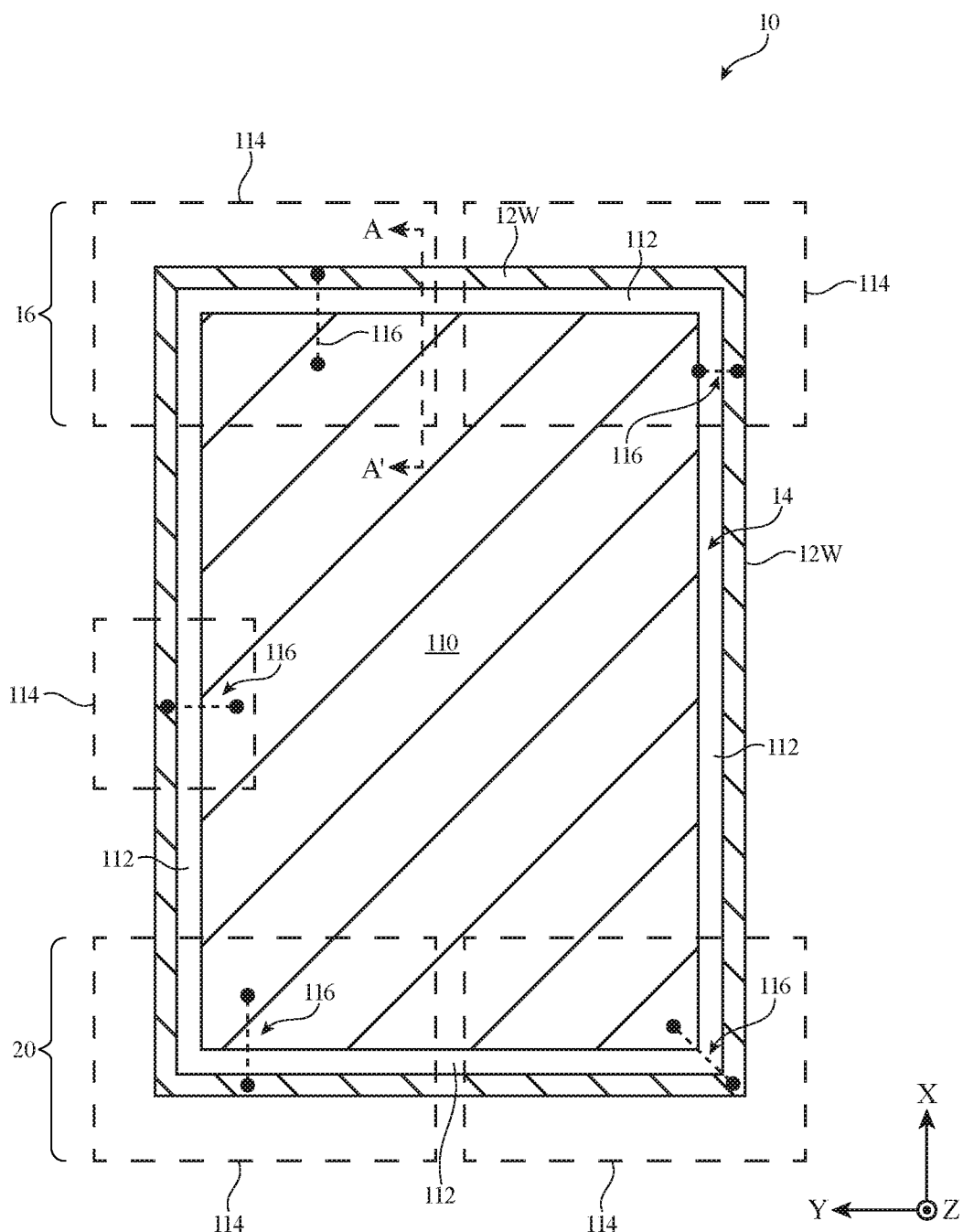
FIG. 3 is a top-down view of an illustrative electronic device having multiple antennas formed at different locations around a display in accordance with an embodiment.

FIG. 3 is a top-down view of device 10 showing different regions of device 10 that can be used to form antennas 40. The display cover layer of display 14 is omitted from the example of FIG. 3 for the sake of clarity. As shown in FIG. 3, conductive display structures 110 may be separated from conductive sidewalls 12W by gaps 112. Gaps 112 may, for example, define inactive area IA of display 14 (FIG. 1).

Antennas 40 (FIG. 2) may be formed within one or more regions 114 of FIG. 3. Regions 114 may be located within region 16 at the upper end of device 10, within region 20 at the lower end of device 10, and/or at locations between the ends of device 10. In one suitable arrangement, different antennas 40 may be formed within different regions 114 at each of the corners of device 10. Each region 114 may include multiple antennas if desired. In general, device 10 may include any desired number of antennas 40 formed within any desired number of regions 114 at any desired locations around the periphery of device 10.

Conductive sidewalls 12W may be used in forming antenna ground 102 and/or antenna resonating element 104 (FIG. 2) for the antennas 40 within regions 114. For example, conductive sidewalls 12W may be separated from conductive rear housing wall 12R (FIG. 1) within regions 114 by one or more dielectric slots. Antenna feed terminals 98 and 100 of FIG. 2 may be coupled across these slots to feed antennas 40 (e.g., antenna feed terminal 98 or 100 may be coupled to conductive sidewall 12W whereas the other antenna feed terminal is coupled to conductive rear housing wall 12R on an opposing side of the slot). This may establish an aperture (volume) for each antenna that supports electromagnetic radiation within one or more desired frequency bands.

In practice, conductive display structures 110 may overlap and/or may be in close proximity to the antenna apertures within regions 114. Conductive display structures 110 over or near to the antenna apertures may serve to block some of the radio-frequency signals conveyed by the antennas, particularly through display 14. This can reduce the efficiency and bandwidth of the antennas through the front face of device 10.

In order to mitigate these effects, conductive display structures 110 may be coupled to ground (e.g., antenna ground 102 of FIG. 2) at one or more locations overlapping each antenna aperture (e.g., within regions 114 of FIG. 3). Conductive grounding structures such as conductive grounding structures 116 may be used to couple conductive display structures 110 to conductive sidewalls 12W at one or more locations within each region 114 (e.g., overlapping each antenna aperture). Conductive grounding structures 116 may have a first terminal coupled to conductive sidewalls 12W and a second terminal coupled to conductive display structures 110 (e.g., conductive grounding structures 116 may bridge gap 112 and may overlap the antenna aperture for a corresponding antenna 40). This may couple the portion of conductive display structures 110 adjacent to each antenna aperture to a ground potential (e.g., antenna ground 102 of FIG. 2), thereby allowing radio-frequency signals for the antennas to pass through display 14 without being substantially blocked by conductive display structures 110.

Grounding structures 116 may overlap any desired locations within the antenna 40 of each region 114. As examples, grounding structures 116 may overlap an antenna return path, antenna tuning element, antenna feed terminals, antenna resonating element arms, and/or other portions of each antenna 40. Conductive display structures 110 may be coupled to conductive sidewalls 12W by multiple grounding structures 116 if desired (e.g., multiple grounding structures 116 may be formed within each region 114).

Figure 4:
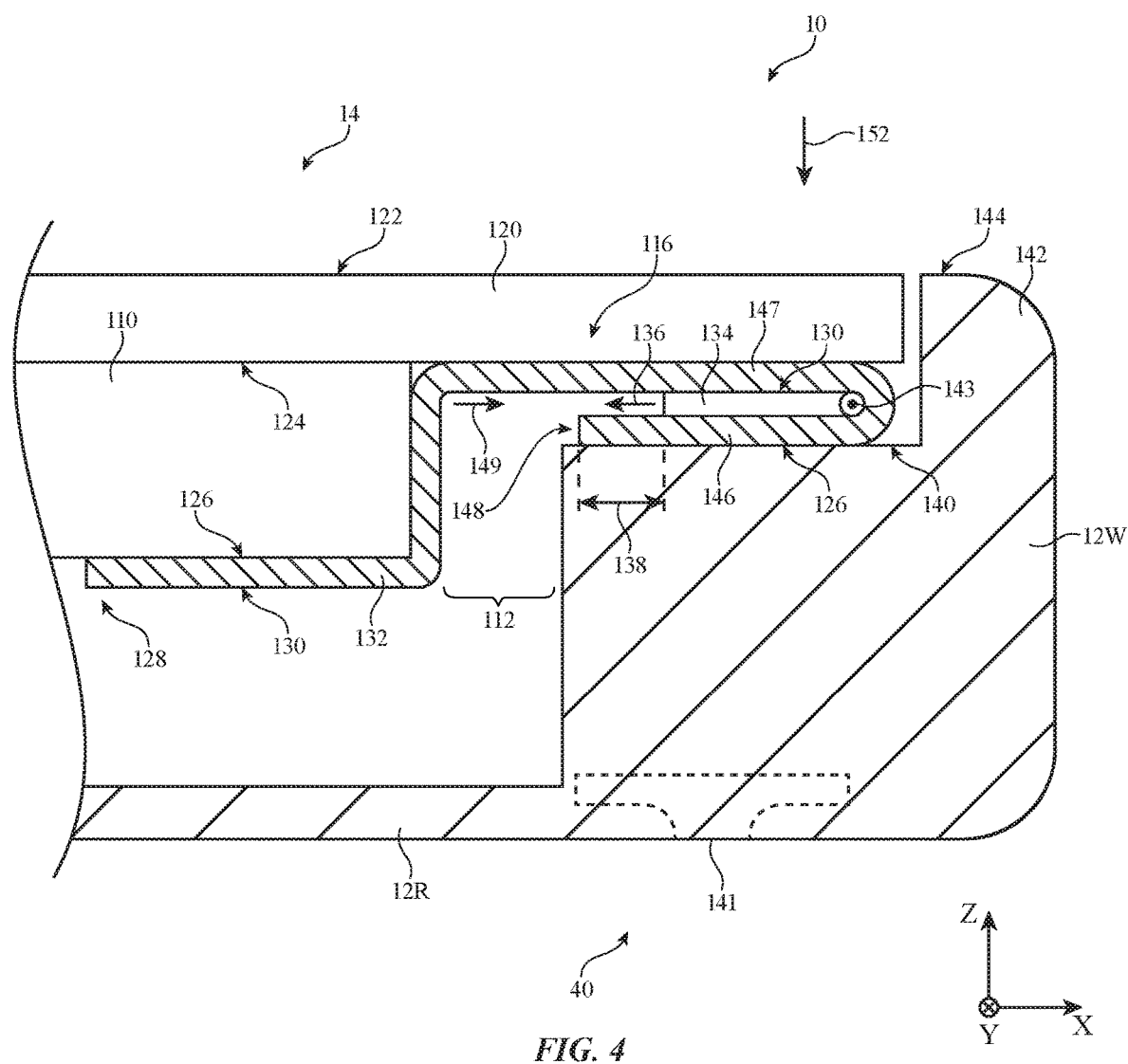
FIG. 4 is a cross-sectional side view showing how grounding structures for a display may be formed from conductive tape that secures the display to an electronic device housing in accordance with an embodiment.

Grounding structures 116 may each include conductive wire, sheet metal, conductive foam, conductive adhesive, welds, solder, conductive springs, conductive pins, conductive tape, and/or any other desired conductive structures. FIG. 4 is a cross-sectional side view of device 10 (e.g., as taken along line AA' of FIG. 3) in an example where grounding structures 116 include conductive tape.

As shown in FIG. 4, display 14 may include display cover layer 120 mounted to conductive display structures 110 (e.g., conductive display structures 110 may be mounted to inner surface 124 of display cover layer 120). Display cover layer 120 may be transparent and may be formed from any desired materials such as glass, plastic, or sapphire. Portions of display cover layer 120 may be provided with an opaque masking layer such as an ink layer if desired.

Display 14 may be mounted to conductive sidewalls 12W. Conductive sidewalls 12W may be separated from conductive rear housing wall 12R by gap 141. Dielectric material may be placed within gap 141 and may lie flush with the exterior surface of device 10. Conductive sidewall 12W may have an inwardly-protruding portion (extension) 140 that is sometimes referred to herein as ledge 140 or datum 140. Ledge 140 may have a lateral surface that extends parallel to inner surface 124 of display cover layer 120. Display 14 may be secured to conductive sidewall 12W by coupling display cover layer 120 to ledge 140 using adhesive material.

Antenna 40 may be formed from conductive rear housing wall 12R and conductive sidewall 12W. For example, antenna terminals 98 and 100 of antenna 40 (FIG. 2) may be coupled to conductive rear housing wall 12R and conductive sidewall 12W on opposing sides of gap 141. Gap 141 (sometimes referred to herein as slot 141) may form a slot antenna resonating element for antenna 40, as one example. The lateral area of gap 141 (e.g., within the X-Y plane of FIG. 4) may define part of the antenna aperture for antenna 40. Gap 141 may extend parallel to the Y-axis of FIG. 4 and may have an elongated length that helps to define the resonating frequency of antenna 40. Gap 141 may extend up the height of an adjacent conductive sidewall 12W if desired (e.g., gap 141 and gaps such as gap 18 of FIG. 1 may be formed from a single continuous dielectric-filled gap extending along multiple sides of device 10).

In the absence of conductive grounding structures, the presence of conductive display structures 110 in the vicinity of antenna 40 may limit antenna efficiency and bandwidth through display cover layer 120. Grounding structures 116 may couple conductive display structures 110 to conductive housing wall 12W to maximize antenna efficiency and bandwidth through display cover layer 120. As shown in FIG. 4, grounding structures 116 may include conductive tape structures such as conductive tape 132.

Conductive tape 132 may include a layer of conductive material having a first lateral surface 126 and an opposing second lateral surface 130. A layer of adhesive material such as heat-activated, pressure-sensitive adhesive may be provided on surface 126 and/or surface 130 of conductive tape 132. In the example of FIG. 4, a layer of adhesive is provided on surface 126 of conductive tape 132 whereas surface 130 is free from adhesive. Surface 126 may therefore sometimes be referred to herein as adhesive surface 126 whereas surface 130 is sometimes referred to herein as non-adhesive surface 130. The conductive material in conductive tape 132 may include copper, gold, and/or other metals.

Conductive tape 132 may have a first end 128 that is mechanically and electrically coupled to conductive display structures 110 and a second end 148 that is mechanically and electrically coupled to ledge 140 of conductive sidewall 12W. As shown in FIG. 4, adhesive surface 126 at end 128 of conductive tape 132 may be attached to conductive display structures 110. If desired, adhesive surface 126 may additionally or alternatively be coupled to the side of conductive display structures 110. Adhesive surface 126 may also be attached to inner surface 124 of display cover layer 120.

When display 14 is mounted to conductive sidewall 12W, a vertical portion 142 of conductive sidewall 12W may extend around the lateral periphery of display cover layer 120. Exterior surface 122 of display cover layer 120 may lie flush with top surface 144 of conductive sidewall 12W (e.g., top surface 144 of vertical portion 142 of conductive sidewall 12W). In practice, it can be difficult to ensure that exterior surface 122 of display cover layer 120 lies flush with top surface 144 of conductive sidewall 12W. For example, the thickness of conductive tape 132 may be less than the vertical distance between top surface 144 and ledge 140 and manufacturing variations in conductive sidewall 12W and display cover layer 120 can make it difficult to produce a large quantity of electronic devices 10 having uniform exterior surfaces.

In order to mitigate these difficulties, end 148 of conductive tape 132 may be wrapped around a layer of heat-activated film such as heat-activated film 134. For example, heat-activated film 134 may be coupled to non-adhesive surface 130 of conductive tape 132. End 148 of conductive tape 132 may be wrapped around axis 143 such that heat-activated film 134 is interposed between parallel portions 147 and 146 of conductive tape 132. Adhesive surface 126 within portion 147 of conductive tape 132 may be attached to inner surface 124 of display cover layer 120. Adhesive surface 126 within portion 146 of conductive tape 132 may be attached to ledge 140.

Heat-activated film 134 may be deformable (compressible) when heated above a predetermined activation temperature and may retain a deformed (compressed) shape after cooling below the activation temperature. During assembly of device 10, heat-activated film 134 may be heated above the activation temperature and display cover layer 120 may be pressed downward onto conductive sidewall 12W (e.g., in the direction of arrow 152) until exterior surface 122 lies flush with top surface 144 of conductive sidewall 12W. Heat-activated film 134 may then be cooled below the activation temperature so that display cover layer 120 is locked in place (e.g., while surface 122 is flush with surface 144). In this way, surface 122 may lie flush with surface 144 in the fully-assembled device 10 regardless of any manufacturing variations in display 14 and conductive sidewall 12W.

Once heat-activated film 134 has been cooled, adhesive surface 126 of conductive tape 132 may adhere display cover layer 120 to conductive sidewall 12W. At the same time, conductive tape 132 may hold conductive display structures 110 at a ground potential by electrically coupling conductive display structures 110 to antenna ground 102 (FIG. 2) through conductive sidewall 12W. By grounding conductive display structures 110 over the aperture for antenna 40 (e.g., at a location overlapping slot 141), antenna 40 may radiate radio-frequency signals through display cover layer 120 without being blocked by conductive display structures 110 (e.g., with satisfactory antenna efficiency and bandwidth).

If desired, heat-activated film 134 may be offset from end 148 of conductive tape 132 by distance 138. This may allow room for heat-activated film 134 to expand (as shown by arrow 136) when display cover layer 120 is pressed onto ledge 140 (e.g., without spilling into the interior of device 10). The example of FIG. 4 is merely illustrative. If desired, conductive tape 132 may have other shapes and may follow other paths (e.g., paths conforming to the shape of other components within device 10). Conductive sidewall 12W may have other cross-sectional shapes. Other adhesive materials such as pressure-sensitive adhesive may be used in place of heat-activated film 134 if desired.

Figure 5:
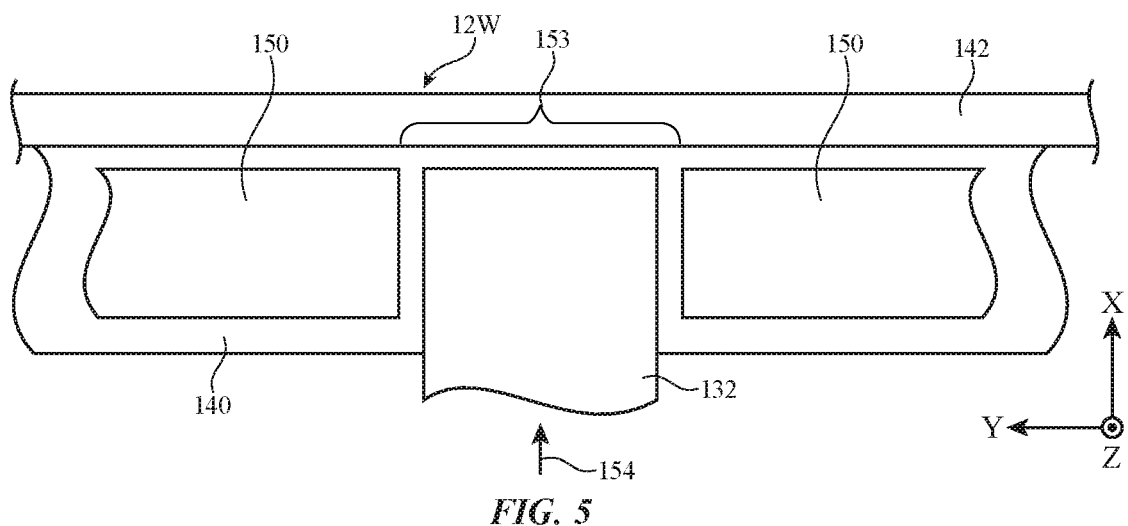
FIG. 5 is a top-down view showing how conductive tape may be placed within a notch in a pressure-sensitive adhesive layer in accordance with an embodiment.

If desired, additional adhesive material may be used to help secure display 14 to conductive sidewall 12W (e.g., to ensure a reliable attachment between display cover layer 120 and ledge 140). FIG. 5 is a top-down view (e.g., in the direction of arrow 152 of FIG. 4) showing how additional adhesive material may be used to attach display cover layer 120 to ledge 140.

In the example of FIG. 5, display cover layer 120 has been omitted for the sake of clarity. As shown in FIG. 5, a layer of adhesive such as adhesive 150 may be attached to ledge 140 of conductive sidewall 12W. Vertical portion 142 of conductive sidewall 12W may extend vertically (e.g., parallel to the Z-axis) beyond the top lateral surface of adhesive 150. Adhesive 150 may be, for example, pressure-sensitive adhesive that is activated by pressing display cover layer 120 onto conductive sidewalls 12W and/or by heating. Adhesive 150 is sometimes referred to herein as pressure-sensitive 150 for the sake of simplicity. In practice, adhesive 150 may additionally or alternatively be activated by heat and may sometimes be referred to herein as heat-activated, pressure-sensitive adhesive 150 or heat-activated adhesive 150.

Pressure-sensitive adhesive 150 may include a notch or gap 153. Conductive tape 132 may be attached to ledge 140 of conductive sidewall 12W within notch 153 of pressure-sensitive adhesive 150. In this way, pressure-sensitive adhesive 150 may enhance the mechanical attachment between display cover layer 120 and conductive sidewall 12W while also accommodating conductive tape 132. Conductive tape 132 may serve to both help adhere display cover layer 120 to conductive sidewall 12W and to ground conductive display structures 110 (FIG. 4).

Figure 6:
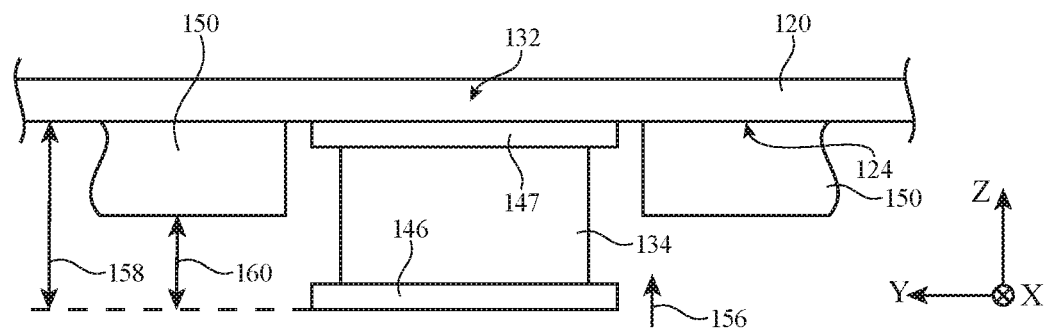
FIGS. 6 and 7 are side views showing how conductive tape may be compressed when used to mount a display to an electronic device housing in accordance with an embodiment.
Figure 7:
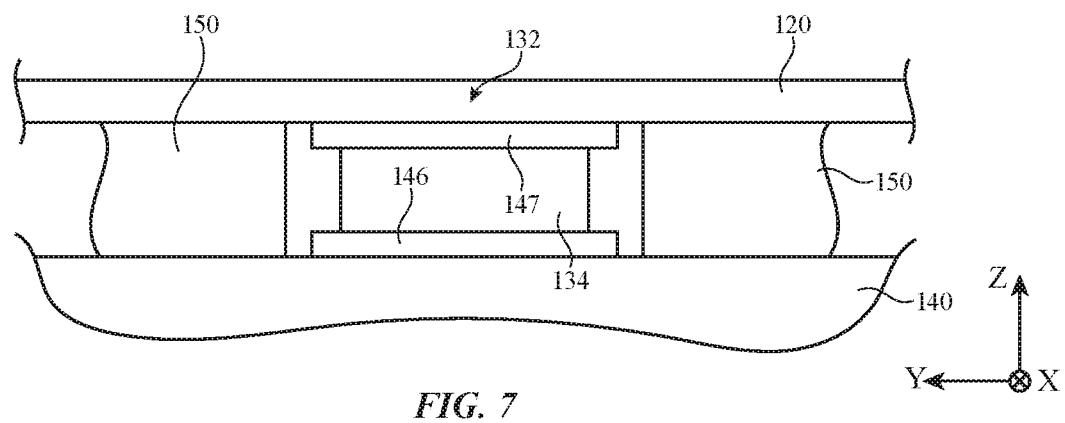

FIGS. 6 and 7 are cross-sectional side views of conductive tape 132 and pressure-sensitive adhesive 150 (e.g., as taken in the direction of arrow 154 of FIG. 5 or arrow 149 of FIG. 4). In the example of FIG. 6, pressure-sensitive adhesive 150 and conductive tape 132 have been attached to display cover layer 120 but have not yet been attached to conductive sidewall 12W. As shown in FIG. 6, conductive tape 132 and heat-activated film 134 may have a vertical thickness 158 (e.g., with respect to display cover layer 120) that is greater than the vertical thickness of pressure-sensitive adhesive 150 by distance 160. When heat-activated film 134 is heated, display cover layer 120 may be pressed onto ledge 140 and heat-activated film 134 may be compressed, as shown by arrow 156. This may allow display cover layer 120 to be mounted to conductive sidewall 12W such that exterior surface 122 lies flush with top surface 144 of conductive sidewall 12W (e.g., as shown in FIG. 4) regardless of potential manufacturing variations.

In the example of FIG. 7, pressure-sensitive adhesive 150 and conductive tape 132 have been attached to ledge 140 of conductive sidewall 12W. Heat-activated film 134 has been compressed as necessary for portion 146 of conductive tape 132 to lie flush with the bottom surface of pressure-sensitive adhesive 150 at ledge 140. Heat-activated film 134 holds this compressed configuration after cooling. Portion 147 of conductive tape 132 may be adhered to display cover layer 120 whereas portion 146 of conductive tape 132 is adhered to ledge 140. Conductive tape 132 of FIGS. 4-7 may be used to form grounding structures 116 for each antenna 40 in device 10 if desired (e.g., within one or more regions 114 of FIG. 3).

The example of FIGS. 4-7 in which grounding structures 116 include conductive tape are merely illustrative. In another suitable arrangement, end 148 of conductive tape 132 may be un-folded. In this arrangement, conductive tape 132 may include a planar end that extends between display cover layer 120 and ledge 140 (e.g., a portion of conductive tape 132 may be interposed between display cover layer 120 and ledge 140). In this scenario, the layer of pressure-sensitive adhesive (e.g., pressure-sensitive adhesive 150 of FIGS. 5-7 or heat-activated, pressure sensitive adhesive) may be formed without notch 153 (FIG. 5) and may extend over conductive tape 132 to adhere conductive tape 132 (and conductive sidewall 12W) to display cover layer 120 (e.g., the pressure-sensitive adhesive may be interposed between the portion of conductive tape 132 coupled to ledge 140 and display cover layer 120).

Figure 8:
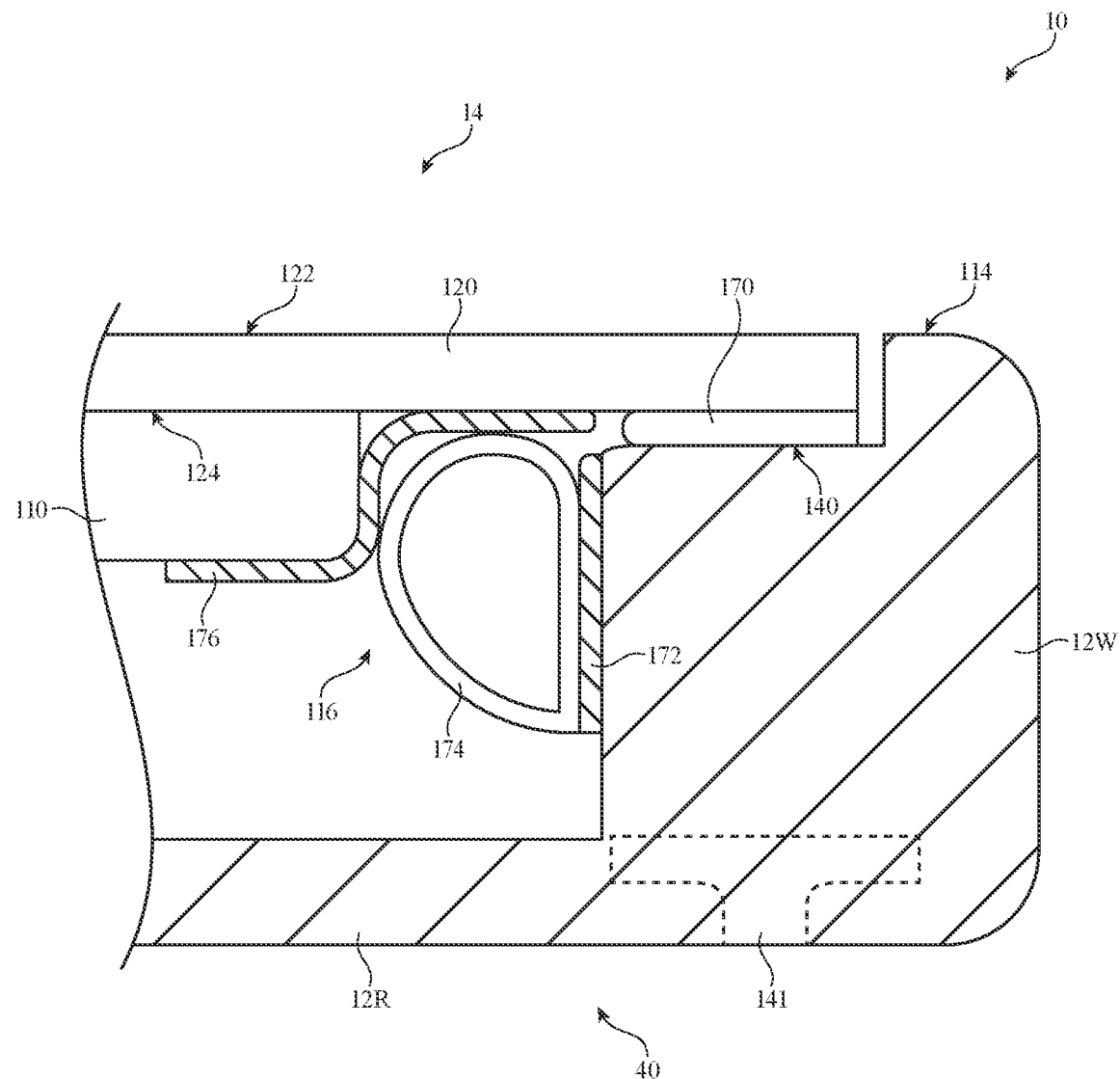
FIG. 8 is a cross-sectional side view showing how an air loop gasket may be used to form conductive grounding structures for a display in accordance with an embodiment.

If desired, grounding structures 116 may include an air loop gasket. FIG. 8 is a cross-sectional side view of device 10 (e.g., as taken along line AA' of FIG. 3) in an example where conductive grounding structures 116 include an air loop gasket.

As shown in FIG. 8, grounding structures 116 may include conductive tape 176 coupled to conductive display structures 110 and inner surface 124 of display cover layer 120. A conductive gasket such as conductive gasket 174 may be coupled to conductive tape 176. Conductive gasket 174 may include conductive fabric wrapped around an air cavity or any other desired gasket structures. In one suitable arrangement, conductive gasket 174 may include a Mylar-enforced air loop gasket or other types of air loop gasket (e.g., a gasket having a conductive fabric surrounding an air cavity, a Mylar stiffener attached to portions of the conductive fabric, and foam within portions of the air cavity).

Conductive gasket 174 may be coupled to conductive sidewall 12W via pressure-sensitive adhesive 172. A layer of pressure-sensitive adhesive such as pressure-sensitive adhesive 170 may be used to attach display cover layer 120 to ledge 140. Display cover layer 120 may be adhered to conductive sidewall 12W through pressure-sensitive adhesive 170 and through conductive tape 176, conductive gasket 174, and pressure-sensitive adhesive 172.

Conductive display structures 110 may be electrically coupled to conductive sidewall 12W via conductive tape 176 and conductive gasket 174. This may couple conductive display structures 110 to the antenna ground to help optimize efficiency and bandwidth through display cover layer 120 for antenna 40. However, in practice, conductive tape of the type shown in FIGS. 4-7 may optimize antenna efficiency and bandwidth more than the conductive gasket of FIG. 8 because conductive tape 132 is grounded to conductive sidewall 12W at a location overlapping the antenna aperture (e.g., overlapping gap 141 of FIG. 4).

Figure 9:
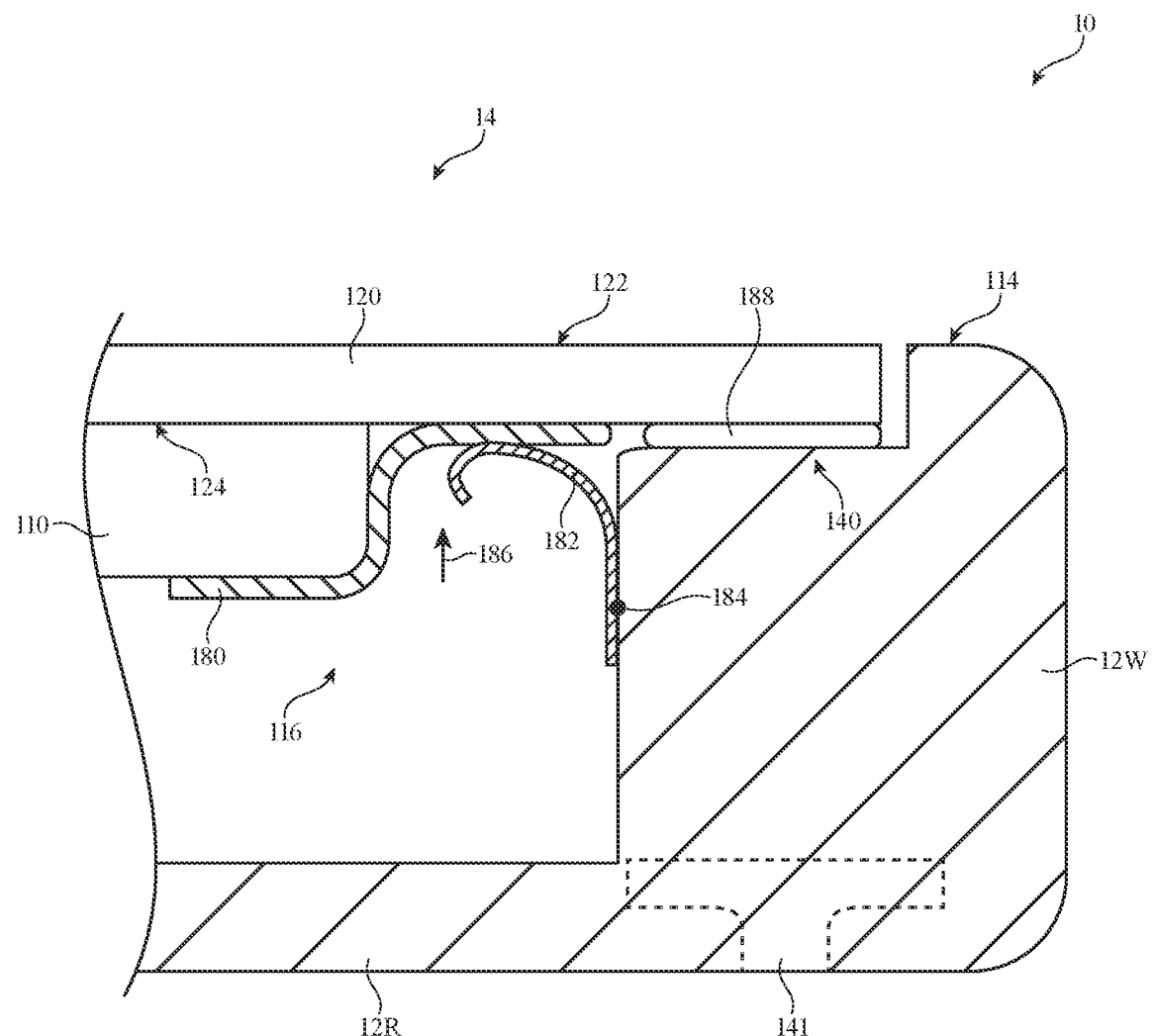
FIG. 9 is a cross-sectional side view showing how a conductive spring may be used to form conductive grounding structures for a display in accordance with an embodiment.

In another suitable arrangement, grounding structures 116 may include a conductive spring. FIG. 9 is a cross-sectional side view of device 10 (e.g., as taken along line AA' of FIG. 3) in an example where conductive grounding structures 116 include a conductive spring.

As shown in FIG. 9, grounding structures 116 may include conductive tape 180 coupled to conductive display structures 110 and inner surface 124 of display cover layer 120. A conductive spring such as conductive spring finger 182 may be coupled to conductive tape 180. Conductive spring finger 182 may be coupled to conductive housing 12W using one or more welds 184. Conductive spring finger 182 may be biased against conductive tape 180 (e.g., conductive spring finger 182 may apply a spring force against tape 180 as shown by arrow 186). This may help to maintain a mechanical and electrical connection between conductive spring finger 182 and conductive tape 180 over time.

A layer of pressure-sensitive adhesive such as pressure-sensitive adhesive 188 may be used to attach display cover layer 120 to ledge 140. Display cover layer 120 may be adhered to conductive sidewall 12W through pressure-sensitive adhesive 188. Conductive display structures 110 may be electrically coupled to conductive sidewall 12W via conductive tape 180 and conductive spring finger 182. This may electrically couple conductive display structures 110 to the antenna ground to help optimize efficiency and bandwidth through display cover layer 120 for antenna 40. Forming grounding structure 116 using conductive spring finger 182 may simplify the manufacture of device 10 relative to the arrangements of FIGS. 4-8, for example. However, in practice, force 186 provided by conductive spring finger 182 against conductive tape 180 can leave display cover layer 120 more susceptible to delamination than the arrangements of FIGS. 4-8.

The examples of FIGS. 4-9 are merely illustrative. Combinations of the grounding arrangements in FIGS. 4-9 may be used if desired. In one suitable arrangement, grounding structures 116 may include conductive traces printed onto inner surface 124 of display cover layer 120 (e.g., the portion of conductive tape 132 of FIG. 4, conductive tape 176 of FIG. 8, or conductive tape 180 of FIG. 9 that is in contact with inner surface 124 may be formed from conductive traces printed onto inner surface 124).

Forming grounding structures 116 using conductive tape 132 of FIGS. 4-7 may allow grounding structures for each antenna 40 in device 10 to be assembled simultaneously and during the same process that is used to attach display 14 to conductive sidewalls 12W. This may, for example, reduce process variations antenna-to-antenna and may help to ensure that exterior surface 122 of display cover layer 120 lies flush with top surface 144 of conductive sidewalls 12W at all points along the front face of device 10. This may also serve to limit device-to-device variations when assembling large quantities of electronic devices such as electronic device 10.

Figure 10:
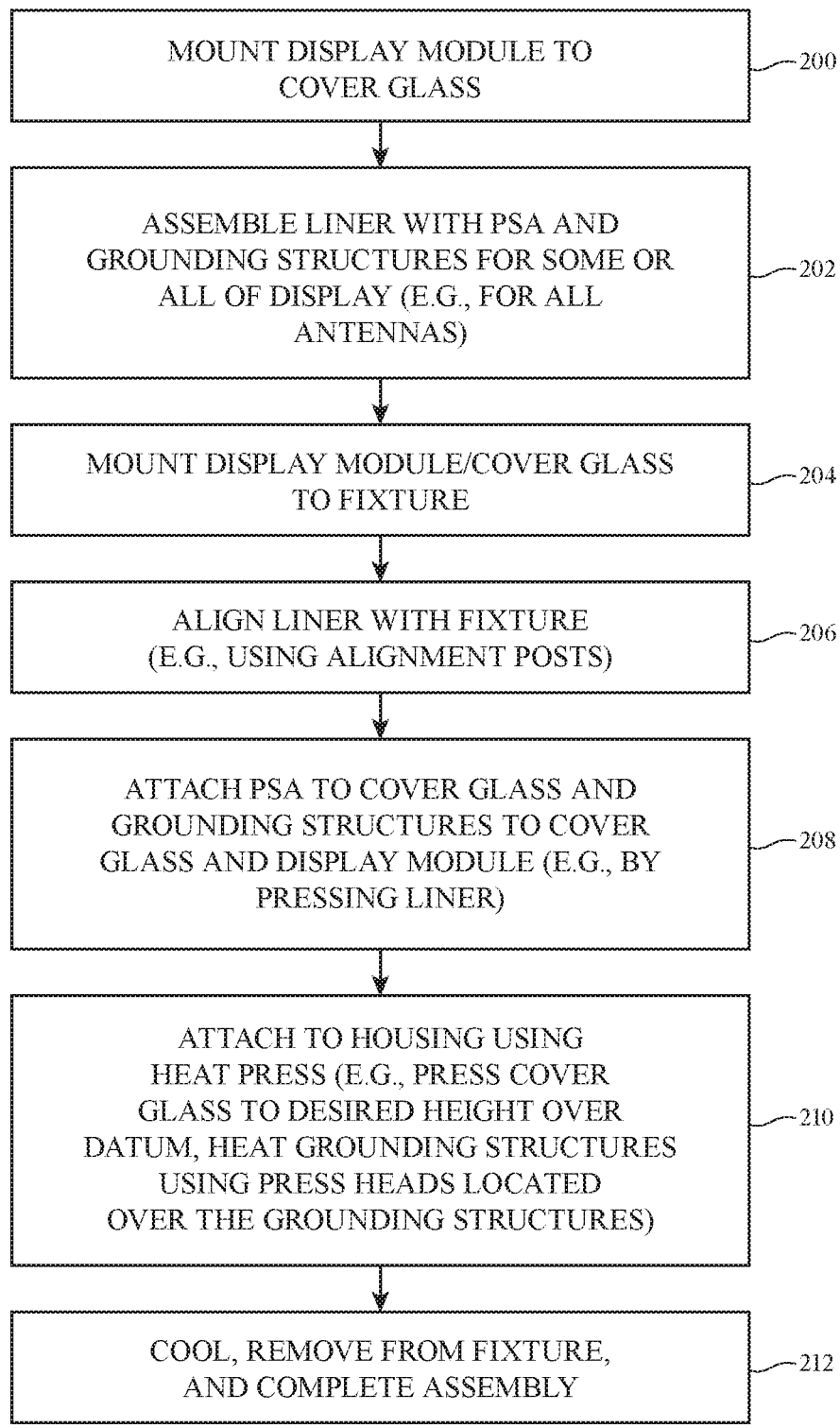
FIG. 10 is flow chart of illustrative steps that may be performed in assembling an electronic device having conductive grounding structures formed from conductive tape in accordance with an embodiment.

FIG. 10 is a flow chart of illustrative steps that may be performed in assembling display 14 to conductive sidewalls 12W (e.g., to concurrently attach grounding structures 116 for each of the antennas 40 in device 10 during the same manufacturing process that is used to attach display 14 to conductive sidewalls 12W). The steps of FIG. 10 may, for example, be performed using manufacturing and assembly equipment (e.g., during assembly/manufacture of electronic device 10).

At step 200, display 14 may be assembled by mounting the display module (e.g., conductive display structures 110 of FIG. 4) to display cover layer 120.

At step 202, pressure-sensitive adhesive 150 (e.g., a layer of heat-activated, pressure sensitive adhesive material) and conductive tape 132 for each antenna 40 (e.g., for each region 114 of FIG. 3) may be attached to a dielectric substrate such as a dielectric liner. The dielectric liner may include openings for aligning to alignment posts in an assembly fixture.

At step 204, display 14 may be mounted to an assembly fixture. The assembly fixture may include alignment posts.

At step 206, the dielectric liner may be aligned with display 14 in the assembly fixture. The alignment holes in the dielectric liner may be placed over the alignment posts of the assembly fixture to align the dielectric liner with display 14. When aligned, the pressure-sensitive adhesive and conductive tape on the dielectric liner may be aligned with the desired locations of grounding structures 116 for each antenna 40 in device 10 (e.g., for each region 114 of FIG. 3).

At step 208, the dielectric liner may be pressed onto display 14 in the assembly fixture. Pressure-sensitive adhesive (PSA) 150 and conductive tape 132 may be adhered to display 14. The dielectric liner may be removed, leaving pressure-sensitive adhesive 150 and conductive tape 132 attached to display 14.

At step 210, display 14 (e.g., with pressure-sensitive adhesive 150 and conductive tape 132) may be flipped and placed over conductive sidewalls 12W. Display 14 may be pressed onto ledge 140 of conductive sidewalls 12W using a heat press. The heat press may apply pressure that activates the pressure-sensitive adhesive to secure display cover layer 120 to ledge 140. The heat press may include heated press heads that are aligned with the locations of conductive tape 132 on display cover layer 120. The heated press heads may heat film 134 on each instance of conductive tape 132 attached to display 14 so that film 134 becomes deformable. The press heads may then press down on conductive tape 132 until exterior surface 122 of display cover layer 120 lies flush with top surface 144 of conductive sidewalls 12W. By pressing on the conductive tape for each antenna simultaneously (e.g., using the same heat press), surface 122 of display cover layer 120 may be aligned with top surface 144 of conductive sidewall 12W across device 10 with greater precision than in scenarios where the conductive tape for each antenna is heated and pressed in series.

At step 212, heat-activated film 134 is cooled, locking (fixing) display 14 in place on conductive sidewall 12W. Device 10 may be removed from the assembly fixture. Additional device assembly may be performed if desired. The example of FIG. 10 is merely illustrative. Steps 200-212 may be performed in any desired order. Two or more of steps 200-212 may be performed concurrently if desired.

Figure 11A:
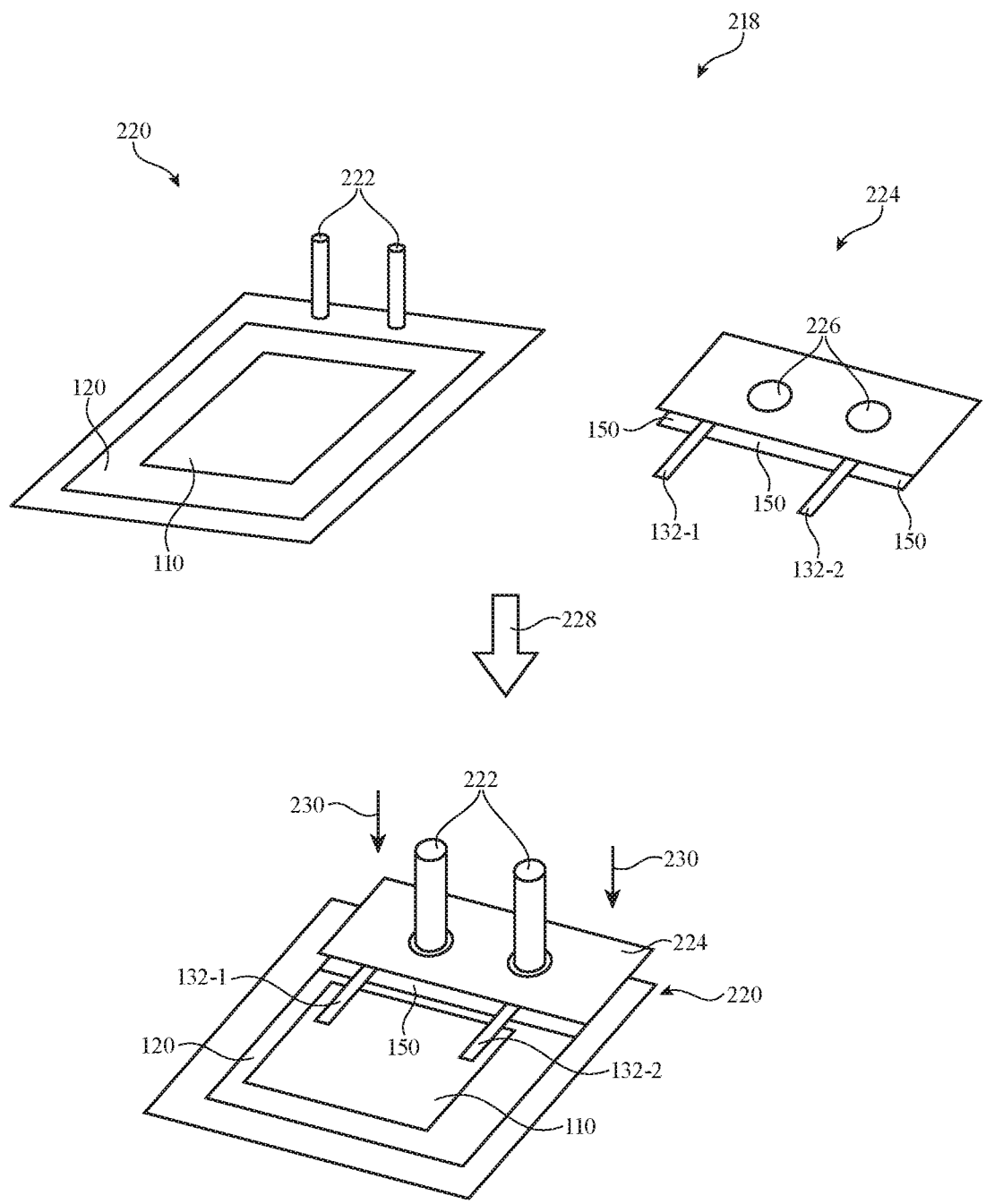
FIGS. 11A and 11B are diagrams of an illustrative assembly process for an electronic device having conductive grounding structures formed from conductive tape in accordance with an embodiment.
Figure 11B:
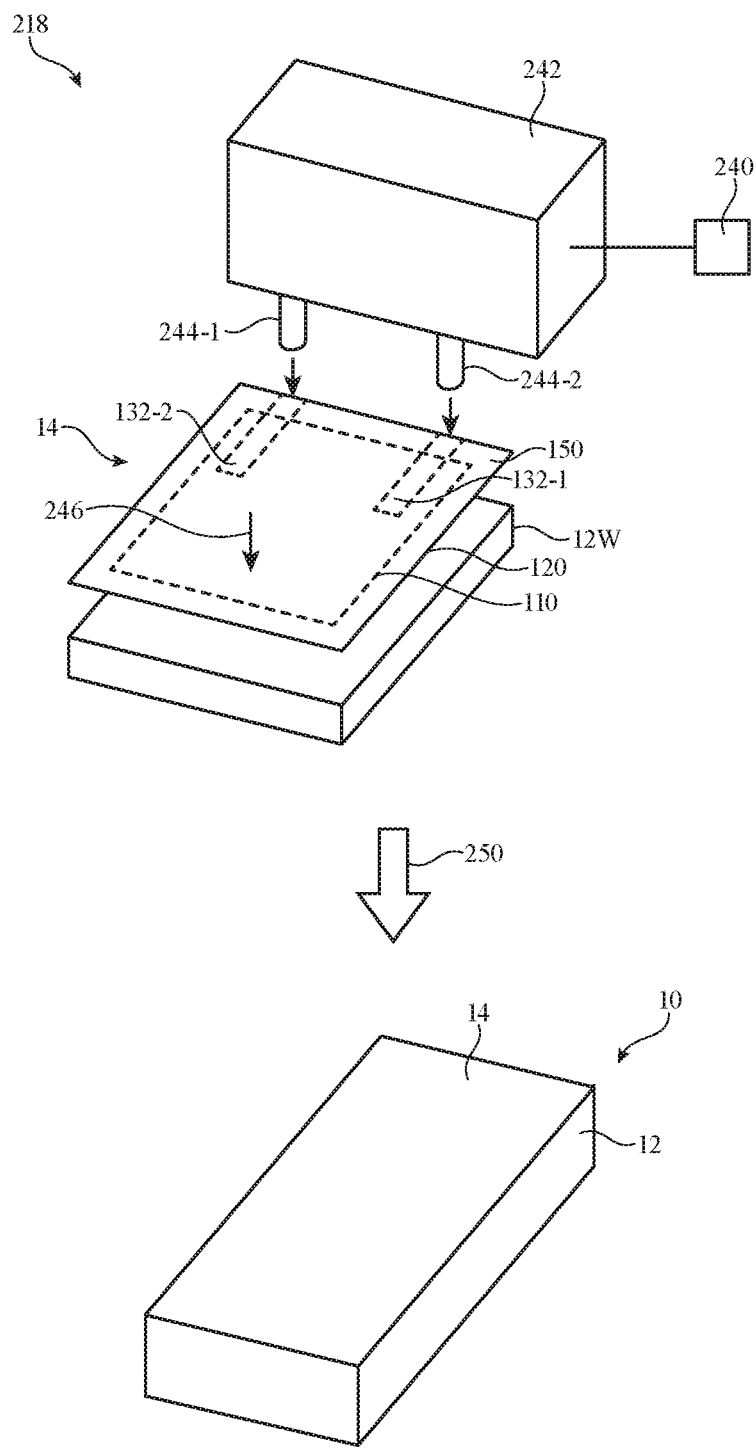

FIGS. 11A and 11B show a diagram of an illustrative assembly process for electronic device 10 (e.g., using the steps of FIG. 10). As shown in FIG. 11A, assembly fixture 220 in manufacturing system 218 may include one or more alignment posts 222. Conductive structures 110 of display 14 may be mounted to display cover layer 120 (e.g., while processing step 200 of FIG. 10). Display cover layer 120 and the attached conductive structures 110 may be mounted to assembly fixture 220 (e.g., while processing step 204 of FIG. 10).

Dielectric liner 224 in manufacturing system 218 may include one or more alignment holes such as alignment holes 226. Pressure-sensitive adhesive 150 and conductive tape 132 for each antenna 40 may be mounted to dielectric liner 224 (e.g., while processing step 202 of FIG. 10). In the example of FIGS. 11A and 11B, device 10 includes two antennas and two conductive tapes 132-1 and 132-2 are mounted to dielectric liner 224 (e.g., one for each antenna). Two or more conductive tapes 132 may be used for each antenna if desired.

Dielectric liner 224 may be placed over assembly fixture 220 as shown by arrow 228. Alignment posts 222 on assembly fixture 220 may pass through alignment holes 226 on dielectric liner 224 to place conductive tapes 132-1 and 132-2 over predetermined locations on display cover layer 120 (e.g., locations where antennas 40 in device 10 are to be formed, as shown by regions 114 of FIG. 3). Dielectric liner 224 may be pressed downwards onto display cover layer 120 and conductive display structures 110, as shown by arrows 230 (e.g., using press equipment in manufacturing system 218). This may attach adhesive surface 126 (FIG. 4) of conductive tapes 132-1 and 132-2 and pressure-sensitive adhesive 150 to display cover layer 120 (e.g., while processing step 208 of FIG. 10). Conductive tapes 132-1 and 132-2 may also be attached to conductive display structures 110. Dielectric liner 224 may be removed from conductive tapes 132-1 and 132-2 and pressure-sensitive adhesive 150, leaving behind conductive tapes 132-1 and 132-2 and pressure-sensitive adhesive 150 on display 14.

As shown in FIG. 11B, display 14, the attached pressure-sensitive adhesive 150, and the attached conductive tapes 132-1 and 132-2 may be flipped over and aligned with conductive sidewalls 12W (e.g., within assembly fixture 220 or separate from assembly fixture 220 of FIG. 11A). Manufacturing system 218 may include heat press 242. Heat press 242 may be coupled to controller 240. Controller 240 may control heat press 242 to move in a particular direction and/or to heat one or more heated press heads 244 to a desired temperature. Heat press 242 may have a respective heated press head 244 for each conductive tape 132 on display 14. In the example of FIG. 11B, heat press 242 has a first heated press head 244-1 aligned with conductive tape 132-2 and a second heated press head 244-2 aligned with conductive tape 132-1.

Controller 240 may control heat press 242 to press downwards onto display cover layer 120, as shown by arrow 246. This may serve to attach pressure-sensitive adhesive 150 to conductive sidewalls 12W. Heated press head 244-1 may press down onto display cover layer 120 at the location of conductive tape 132-2. Heated press head 244-2 may press down onto display cover layer 120 at the location of conductive tape 132-1. Heated press heads 244-1 and 244-2 may be heated to a predetermined temperature greater than or equal to the activation temperature of heat-activated film 134 in conductive tapes 132-1 and 132-2 (e.g., 80 degrees Celsius, 90 degrees Celsius, between 70 and 95 degrees Celsius, etc.). This may activate heat-activated film 134 in conductive tapes 132-2 and 132-1 so that the heat-activated film becomes deformable (e.g., while processing step 210 of FIG. 10). Pressure provided by press heads 244-1 and 244-2 may be adjusted to align exterior surface 122 of display cover layer 120 with top surface 144 of conductive sidewalls 12W (FIG. 4).

Press heads 244-1 and 244-2 of FIG. 11B may subsequently be removed so that the heat-activated film may cool. Once cooled, conductive tapes 132-1 and 132-2 may be adhered to conductive sidewalls 12W and may have a fixed thickness such that exterior surface 122 of display cover layer 120 lies flush with top surface 144 of conductive sidewalls 12W. As shown by arrow 250, a fully assembled device 10 having display 14 mounted to housing 12 may be provided to an end user. The example of FIGS. 11A and 11B is merely illustrative. In general, any desired manufacturing processes may be used to assemble device 10. Dielectric liner 224 of FIG. 11A may extend around multiple sides of display 14.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a device housing having a conductive sidewall;
a display having conductive display structures and a display cover layer overlapping the conductive display structures, wherein the display cover layer has opposing upper and lower surfaces, the lower surface is mounted to the conductive sidewall, and the lower surface is coupled to the conductive display structures; and
grounding structures coupled between the conductive display structures and the conductive sidewall, wherein the grounding structures are interposed between the lower surface and the conductive sidewall and the grounding structures are configured to electrically couple the conductive display structures to the conductive sidewall and to adhere a portion of the display cover layer to the conductive sidewall.

2. The electronic device defined in claim 1, wherein the grounding structures comprise conductive tape.

3. The electronic device defined in claim 2, wherein the conductive tape has a first end coupled to the conductive display structures and a second end coupled to the conductive sidewall, the second end being folded about an axis.

4. The electronic device defined in claim 3, wherein the conductive tape has an adhesive surface that is coupled to the conductive display structures, the display cover layer, and the conductive sidewall.

5. The electronic device defined in claim 4, wherein the conductive tape has a non-adhesive surface that opposes the adhesive surface.

6. The electronic device defined in claim 4, wherein the conductive tape has a first portion adhered to the display cover layer and a second portion adhered to the conductive sidewall and extending parallel to the first portion.

7. The electronic device defined in claim 6, wherein the grounding structures further comprise heat-activated film interposed between the first and second portions of the conductive tape.

8. The electronic device defined in claim 7, wherein the heat-activated film is offset from the second end of the conductive tape.

9. The electronic device defined in claim 2, wherein the conductive tape has a first end coupled to the conductive display structures and a second end that is folded around a layer of heat-activated film, wherein the second end is coupled to a ledge on the conductive sidewall, and wherein the layer of heat-activated film and the second end of the conductive tape are interposed between the lower surface and the ledge.

10. The electronic device defined in claim 9, further comprising:
a layer of pressure-sensitive adhesive on the ledge and configured to adhere the display cover layer to the conductive sidewall.

11. The electronic device defined in claim 10, wherein the layer of pressure-sensitive adhesive comprises a notch and wherein the second end of the conductive tape is adhered to the ledge within the notch.

12. The electronic device defined in claim 2, wherein the grounding structures further comprise a conductive spring finger.

13. The electronic device defined in claim 1, further comprising:
an antenna having an antenna aperture configured to radiate radio-frequency signals through the display cover layer, wherein the conductive sidewall is configured to define at least part of the antenna aperture and wherein the grounding structures at least partially overlap the antenna aperture.

14. The electronic device defined in claim 1, wherein the grounding structures comprise an air loop gasket.

15. Grounding structures for a display in an electronic device, the grounding structures comprising:
conductive tape having opposing first and second lateral surfaces, wherein the first lateral surface comprises an adhesive surface and the conductive tape comprises a first portion and a second portion that extends from an end of the first portion; and
a layer of heat-activated film coupled to the second lateral surface, wherein the layer of heat-activated film is interposed between the first and second portions of the conductive tape and couples the first portion of the conductive tape to the second portion of the conductive tape.

16. The grounding structures defined in claim 15, wherein the first portion of the conductive tape extends parallel to the second portion of the conductive tape.

17. The grounding structures defined in claim 15, wherein the second lateral surface of the conductive tape comprises a non-adhesive surface.

18. A method of assembling an electronic device having a display and conductive housing walls, the method comprising:
attaching pressure-sensitive adhesive, a first conductive tape, and a second conductive tape to a dielectric liner;
with the dielectric liner, concurrently attaching the pressure-sensitive adhesive, the first conductive tape, and the second conductive tape to the display; and
with a heat press, pressing the display onto the conductive housing walls to affix the pressure-sensitive adhesive, the first conductive tape, and the second conductive tape to the conductive housing walls.

19. The method defined in claim 18, wherein the electronic device comprises first and second antenna apertures that are at least partially defined by the conductive housing walls, wherein the heat press comprises first and second heated press heads, and wherein the method further comprises:
with the first heated press head, heating the first conductive tape while pressing on the display at a first location overlapping the first conductive tape; and
with the second heated press head, heating the second conductive tape while pressing on the display at a second location overlapping the second conductive tape, wherein the first conductive tape at least partially overlaps the first antenna aperture and the second conductive tape at least partially overlaps the second antenna aperture in the electronic device.

* * * * *